United States Patent [19]

Mosier et al.

[11] Patent Number: 4,551,766
[45] Date of Patent: Nov. 5, 1985

[54] OPTICAL READER

[75] Inventors: John E. Mosier; Jim B. Surjaatmadja; Jack C. Penn, all of Duncan, Okla.

[73] Assignee: Halliburton Company, Duncan, Okla.

[21] Appl. No.: 355,465

[22] Filed: Mar. 8, 1982

[51] Int. Cl.⁴ .............................................. H04N 1/00
[52] U.S. Cl. .................................... 358/256; 358/286; 358/292
[58] Field of Search ............... 358/256, 286, 213, 293, 358/292

[56] References Cited

U.S. PATENT DOCUMENTS

| | | |
|---|---|---|
| 3,256,480 | 6/1966 | Runge et al. |
| 3,435,134 | 3/1969 | Richards. |
| 3,457,544 | 7/1969 | Miller et al. |
| 3,553,362 | 1/1971 | Mounts. |
| 3,609,244 | 9/1971 | Mounts. |
| 3,872,248 | 3/1975 | Winters .............................. 358/286 |
| 3,876,825 | 4/1975 | Murakami et al. ................... 358/256 |
| 3,882,305 | 5/1975 | Johnstone. |
| 3,955,045 | 5/1976 | Ford, Jr. ............................. 358/261 |
| 4,001,500 | 1/1977 | Lavery et al. |
| 4,020,462 | 4/1977 | Morrin, II. |
| 4,055,763 | 10/1977 | Antkiw. |
| 4,157,659 | 6/1979 | Murdock ............................ 364/474 |
| 4,254,439 | 3/1981 | Fowler et al. ...................... 358/268 |
| 4,258,421 | 3/1981 | Juhasz et al. |
| 4,297,727 | 10/1981 | Ogawa et al. |
| 4,310,887 | 1/1982 | Suau. |
| 4,312,040 | 1/1982 | Tinch et al. |
| 4,327,379 | 4/1982 | Kadakia et al. |
| 4,335,277 | 6/1982 | Puri. |
| 4,390,953 | 6/1983 | Johnstone ........................... 73/151 |

Primary Examiner—Edward L. Coles, Sr.
Attorney, Agent, or Firm—E. Harrison Gilbert, III; Joseph A. Walkowski; Thomas R. Weaver

[57] ABSTRACT

An optical reader contained in a portable case includes elements for rotating a chart containing indicia and for moving a lens and photo-responsive member substantially parallel to the axis of rotation of the chart. These elements are controlled so that the photo-responsive element detects every one of an array of discrete informational units defined by the optical reader on the chart and for generating for each discrete informational unit a respective binary bit having one of two logic values depending upon whether the respective discrete unit is relatively light or relatively dark. The reader also includes circuit elements for detecting every eighth one of the respective binary bits to define a byte of information representing eight of the discrete informational units of the chart. The reader is controlled to commence a read of the chart from the right-hand end and to incrementally read strips of the chart progressing to the left-hand end of the chart. At the conclusion of the reading period, the optical reader is automatically reset to the right-hand end to read the next chart.

6 Claims, 12 Drawing Figures

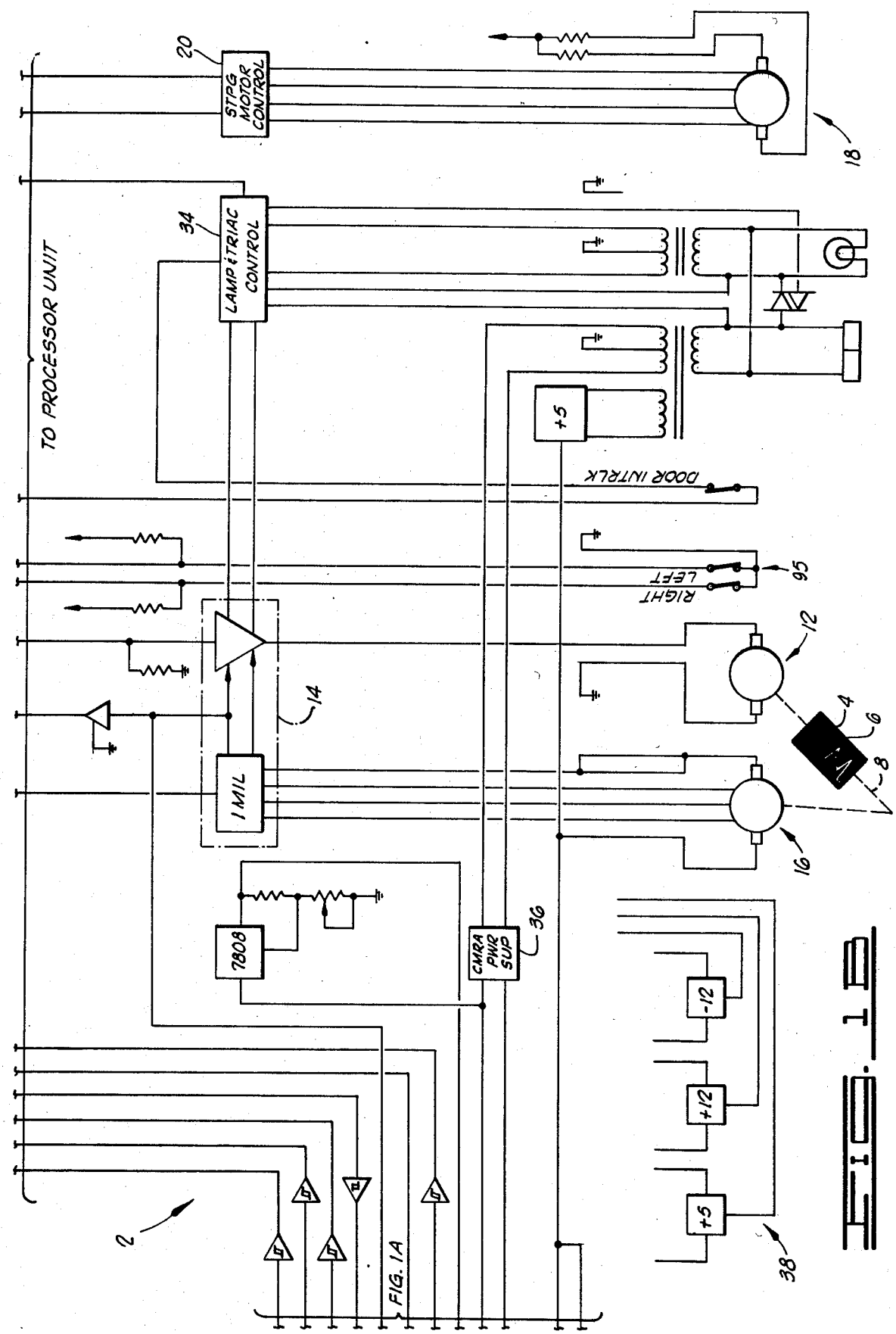

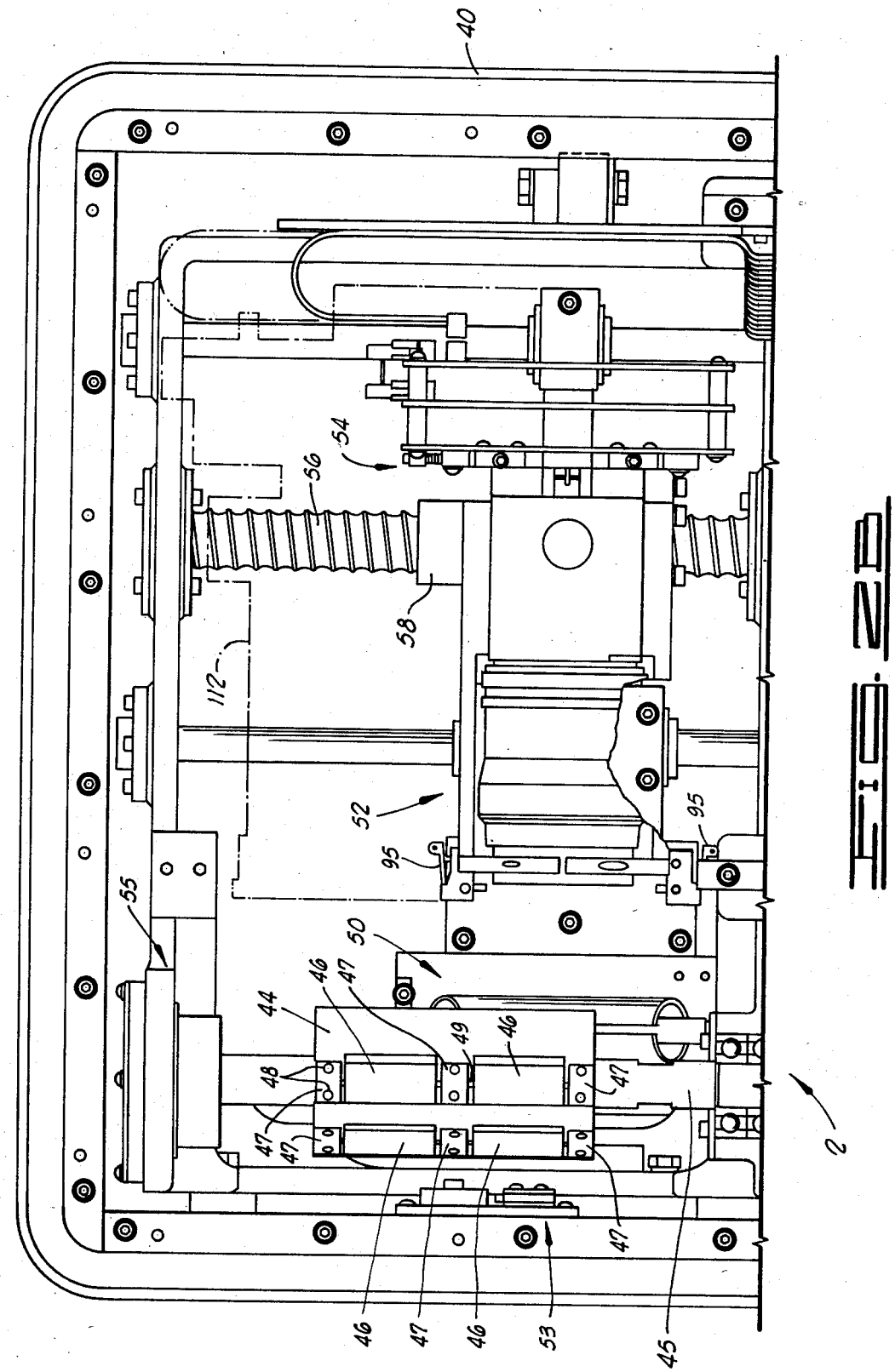

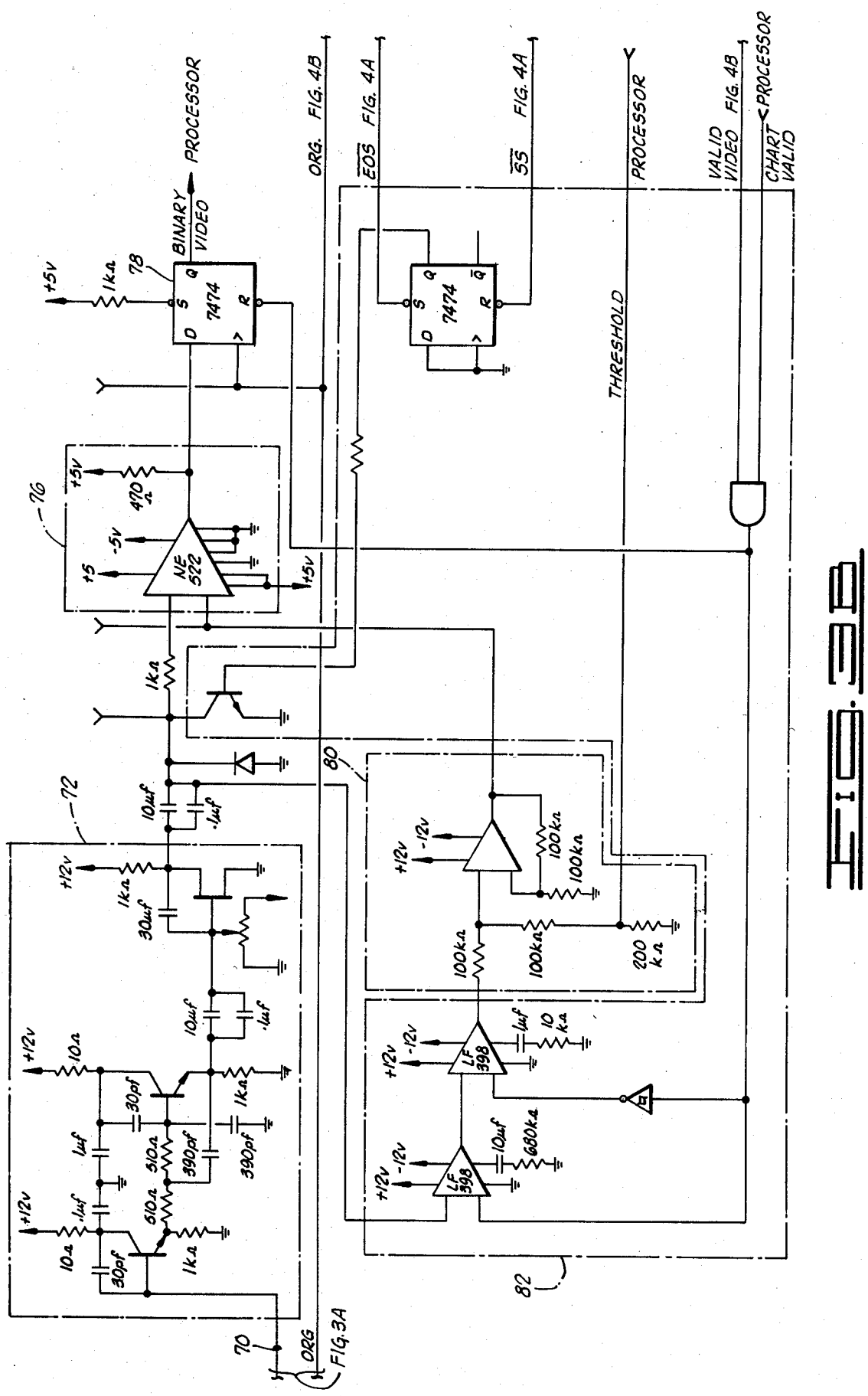

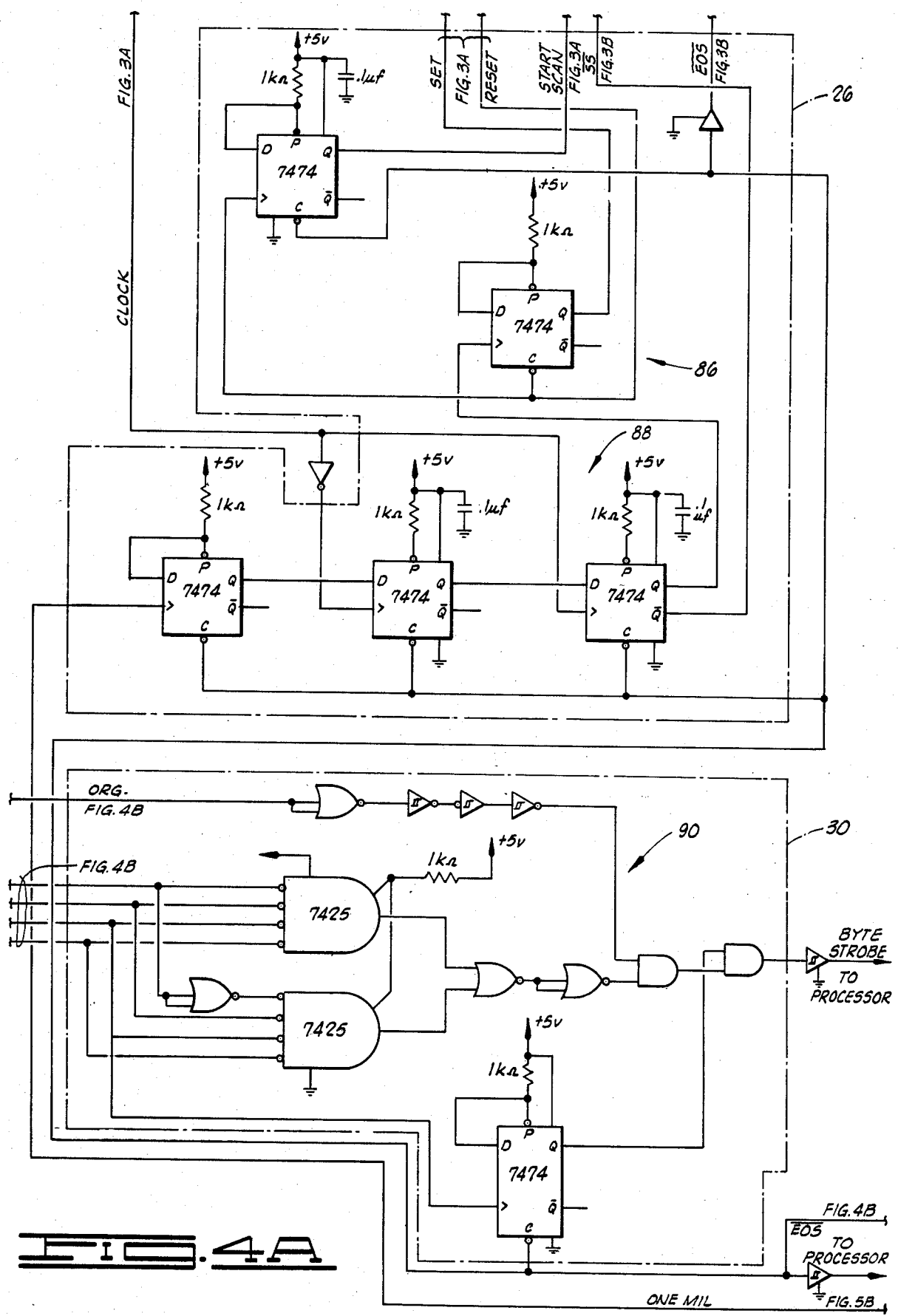

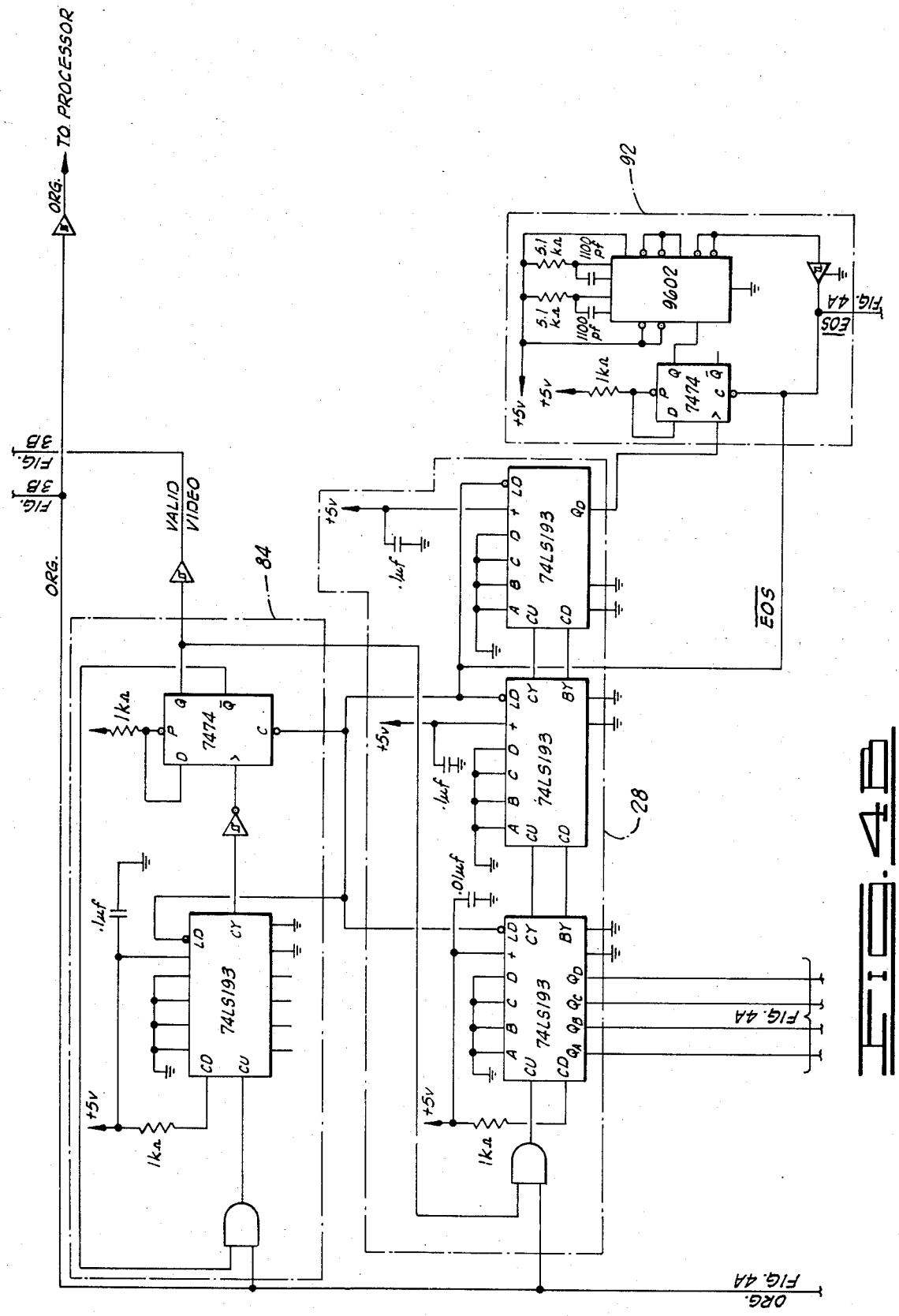

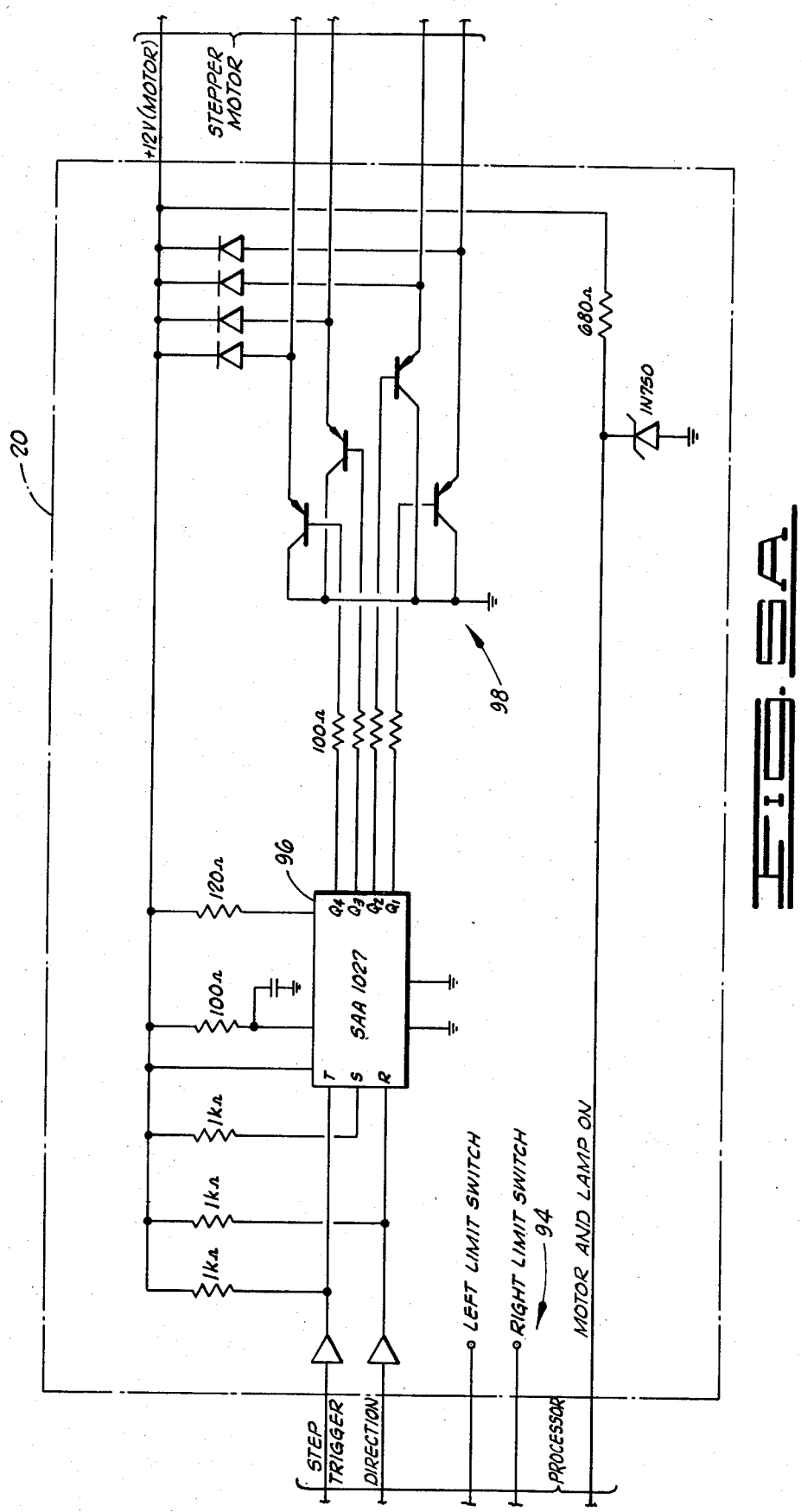

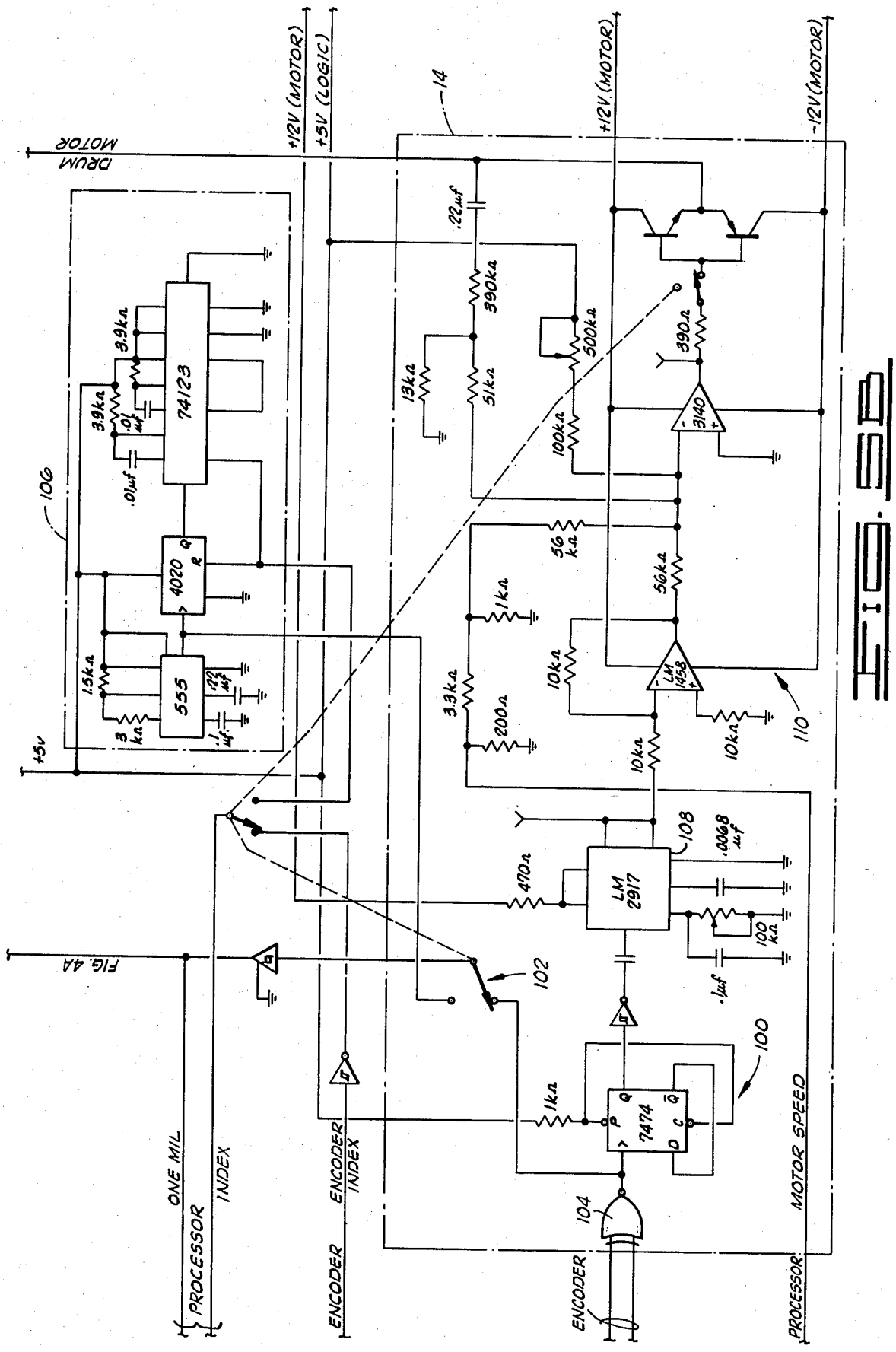

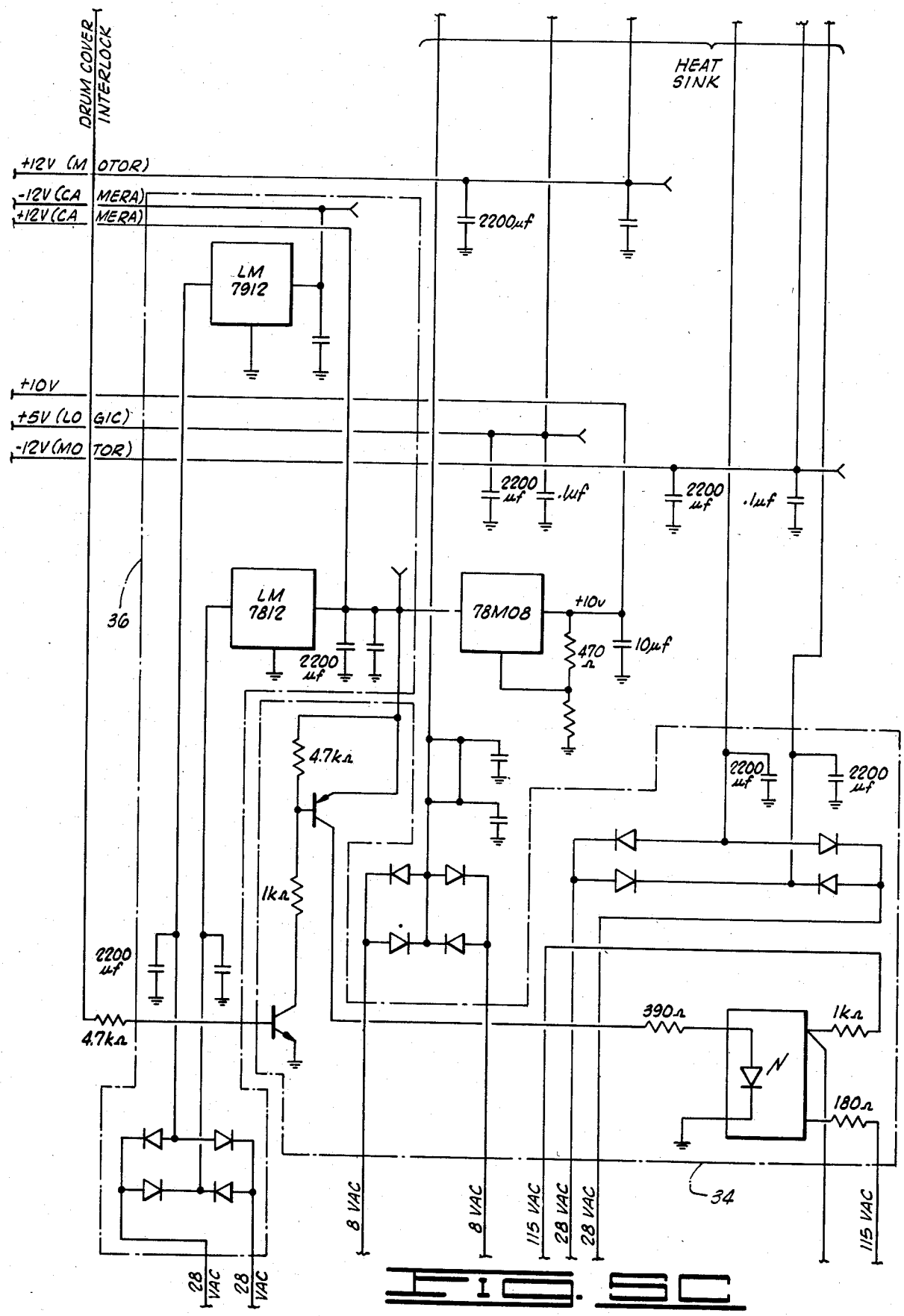

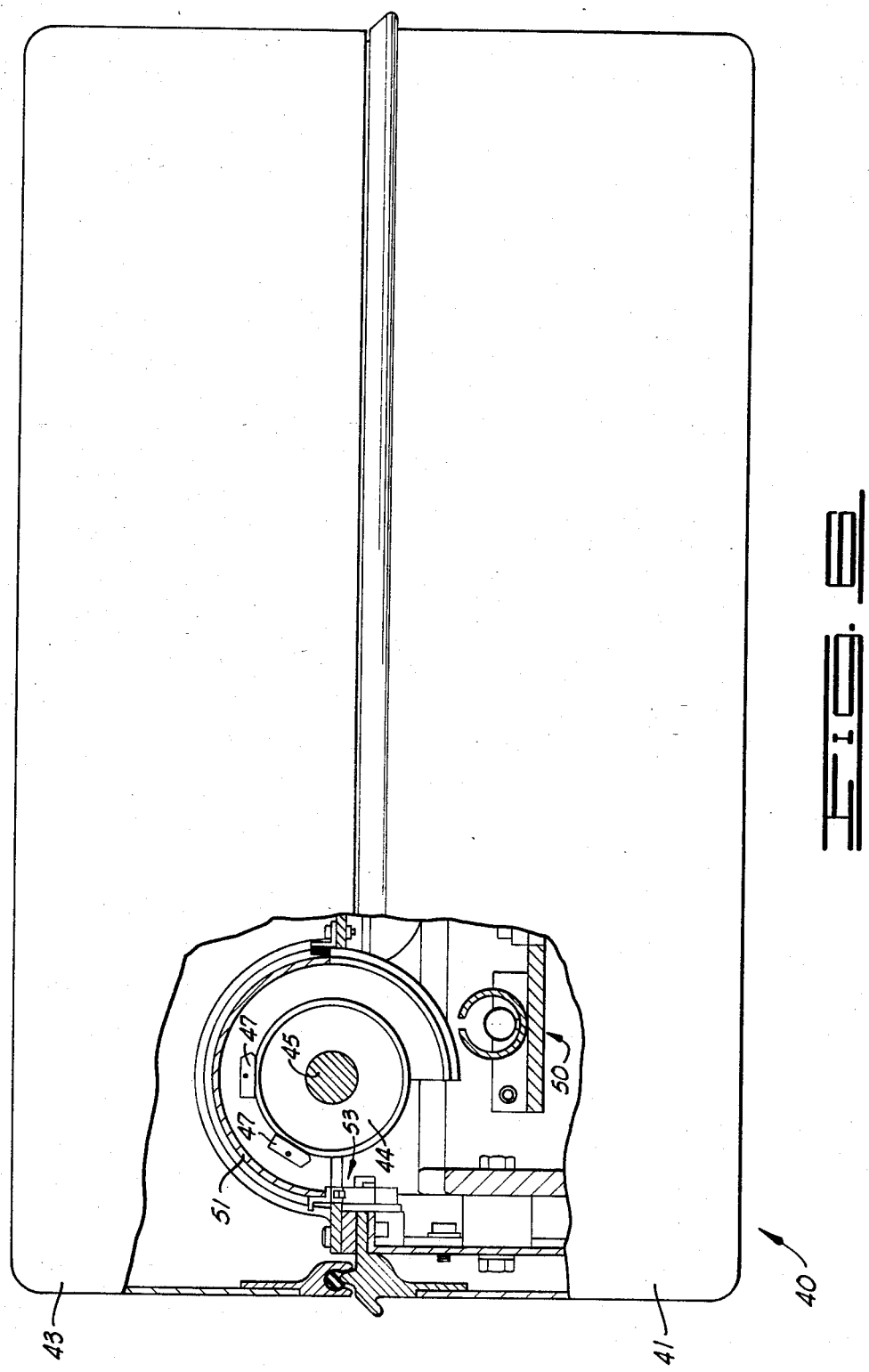

OPTICAL READER

BACKGROUND OF THE INVENTION

1. Field of the Invention

This invention relates generally to optical readers and more particularly, but not by way of limitation, to an optoelectronic system for automatically converting graphic data contained on a drill stem test chart into electrical binary signals.

2. Desciption of Related Art

During the drilling of an oil or gas well it is often desirable to determine the pressure-flow characteristics of the formation into which the well is drilled. This is desirable because the formation pressure-flow information can assist a properly trained person in evaluating whether the well is more or less likely to produce and, if it is likely to produce, in what relative quantities it can be expected to produce. A formation pressure response can also be used to determine what type of well treatment is advisable. Such a determination can be made because the transient response of the formation pressure as a function of time provides means for determining the permeability and other properties of the reservoir. In general, the information which can be derived from a formation pressure-flow reading can be used by the well operator to decide whether to complete, stimulate or abandon the formation.

One manner of obtaining formation pressure-flow data and of analyzing this data is to perform a drill stem test which includes placing a bourdon tube pressure recording device in a test string which is lowered into the well in which the formation pressure is to be recorded. Attached to the bourdon tube is a marking stylus which scribes, in response to formation pressures sensed by the bourdon tube, a graph on a black-coated metal drill stem test chart which moves relative to the stylus. The resultant graph is a record of the pressure sensed by the bourdon tube as a function of time.

Once such a drill stem test chart has been marked at the drill site with a pressure graph, the chart is mailed to a company which provides the service of analyzing the graphic data contained on the chart. Such a company has skilled employees who manually read the chart and convert the graphic data into numerical form for mathematical manipulation by a computer or other calculating means. The computer or other calculating means translates the actual test data (i.e., the converted graphic data) into formation properties needed to guide the well operator's decision to complete, stimulate or abandon the formation. The translation occurs through the use of basic equations and formulas generally known in the reservoir evaluation art.

As the translation process occurs, and thereafter, an expert analyzes the information and prepares a written report containing the facts and the opinions of the expert which the well operator uses in formulating his opinion. Once the report is completed, it is mailed to the customer or well owner.

This manner of processing formation pressure data is time-consuming because mailing the chart to an analysis company, waiting for the analysis to be made, and receiving the report of the analysis by return mail takes several days. The manual reading of each pressure chart also consumes time and permits human error to occur because of the difficulty in accurately and consistently reading charts of the type produced by the aforementioned manner of recording formation pressure. These shortcomings of this type of system are critical because during the interim between the preparation of the formation pressure chart and the receipt of the report, the drilling operation ceases. This is costly because the per day expenses for a drilling rig and a crew can be thousands of dollars.

Another system for preparing and analyzing formation pressure charts includes the utilization of one or more experts in the field at the drilling site. These experts read the charts prepared with a bourdon tube pressure recording device and manually convert the graphic data into numerical form for entry into a computer or other calculating means located either at the drilling site or remotely therefrom.

A shortcoming of this system is the expense of having one or more experts maintained in the field. Additionally, there are not enough qualified experts to be retained on each site of all wells when it is necessary to prepare and analyze formation pressure charts. Still further, the manual conversion of the chart indicia into numerical format consumes time and permits human error to occur.

Still another system for recording formation pressure and for analyzing the pressure data includes real-time electronic sensing and encoding means placed in a downhole tool. Such means senses the pressure and converts it into numerical format for transmission to a computer electrically connected to the sensing and encoding means.

Although such a system saves the time and expense of having an expert read and convert the chart from graphic format to numerical format, this third system is expensive because of the nature of the equipment necessary to construct the system. Additionally, to permit electrical communication between the downhole tool and the equipment located at the surface, a wireline must be run into the well. The presence of the wireline in the hole increases the hazard of blow-outs as known in the art. Still further, this third system is susceptible to malfunction in high temperature areas which are often encountered when making formation pressure recordings.

In view of the shortcomings of the aforementioned systems, there is the need for a system which can relatively quickly automatically convert graphic data (such as appears on a formation pressure chart) or other indicia into electrical signals for computerized numerical processing, which can relatively quickly transfer these signals from a field site at which the data are obtained to an analysis station for calculation and evaluation purposes so that delays through the mail are prevented, and which can prepare a report for transfer back to the field site.

To make such a system compatible with existing tools, such as a bourdon tube pressure recording device and the charts produced thereby, and to reduce the time and expense of having experts manually read the charts, the system should include means for automatically optically reading a chart (or other medium) having graphic or other data scribed or otherwise contained thereon.

It is to such an optical reading means that the present invention is directed. For the disclosure of an example of an overall system in which the present invention is contemplated to be used, reference can be made to the copending patent application of John E. Mosier, Jim B. Surjaatmadja, George B. McLawhon, and Jack C. Penn entitled DATA CONVERSION, COMMUNICA- TION AND ANALYSIS SYSTEM, U.S. patent application Ser. No. 355,317, filed Mar. 8, 1982, now U.S. Pat. No. 4,531,189.

SUMMARY OF THE INVENTION

The present invention overcomes the above-noted and other shortcomings of the aforementioned prior art systems by providing a novel and improved optical reader which is useful, for example, in the analysis of downhole pressure charts of the type described hereinabove.

The present invention provides an apparatus comprising optoelectronic means for automatically scanning a chart or the like, such as a drill stem test chart, having indicia thereon and for automatically converting the indicia into corresponding electrical signals. The optoelectronic means includes means for viewing the surface of the chart or other medium as an array of discrete informational units and means for generating for each discrete unit a respective electrical binary bit having one of two logic values depending upon whether the respective unit is relatively light or relatively dark. The apparatus scans the graphic data or other indicia and converts the scanned material into a series of binary signals, each of which has a respective first or second logic value.

Therefore, from the foregoing it is a general object of the present invention to provide a novel and improved optical reader. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 1A-1B form a functional block diagram of the preferred embodiment of the reader unit of the present invention.

FIGS. 2A-2B form a top plan view of the preferred embodiment of the reader unit of the present invention disposed in the bottom portion of its container.

FIGS. 3A-3B are a schematic circuit diagram of the preferred embodiment of a video section and of a portion of a timing section of the reader unit.

FIGS. 4A-4B are a schematic circuit diagram of the preferred embodiment of another portion of the timing section of the reader unit.

FIGS. 5A, 5B and 5C are a schematic circuit diagram of the preferred embodiment of a motor control section of the reader unit.

FIG. 6 is a partial sectional side elevational view of the preferred embodiment of the reader unit of the present invention.

DETAILED DESCRIPTION OF THE PREFERRED EMBODIMENT

Figure 1A:
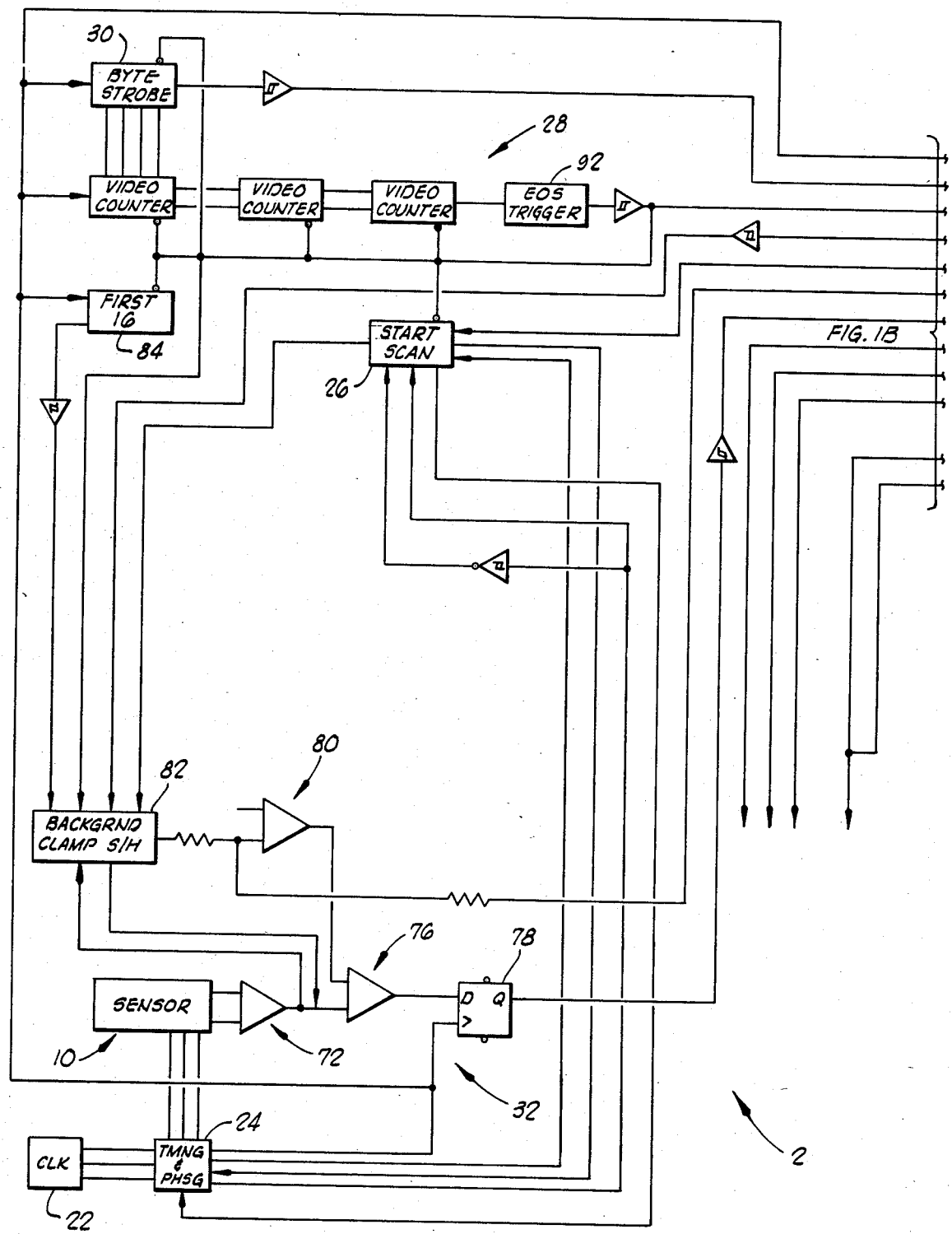

The present invention shown in the preferred embodiment in the drawings and described hereinbelow provides an automatic optical reader system which accurately reads indicia, such as graphic information contained on a drill stem test chart, and translates the indicia into numerical form to be used, for example, for transmission by telephone lines to a central computer for analysis. The automatic reader system is constructed to be powered from a standard commercial power source. Control is maintained with minimal operator interaction so that non-experts can operate the equipment of the automatic reader system. Broadly, the automatic optical reader system is a data conversion instrument which comprises a reader unit 2 and a control processor (not shown in the drawings). The reader unit 2 and the control processor form optoelectronic means for automatically scanning indicia carried on a chart, such as a drill stem test chart 4 illustrated in FIG. 1B or any other suitable medium, and for automatically converting the indicia into electrical signals. By way of example, in the subsequent description the indicia to be scanned will be specifically identified as graphic data on the drill stem test chart 4.

Chart 4 has scribed thereon graphic data 6 representing, in the preferred embodiment, pressure versus time information recorded during a drill stem test. The chart 4 in the preferred embodiment is a brass plate having a flat black coating which, when scribed by a bourdon tube pressure recording device stylus, yields a relatively light line on a relatively dark background. Although the preferred embodiment is disclosed to be used with such a chart having light indicia on a dark background, it is contemplated that the present invention can be used with dark indicia on a light background and with indicia other than graphic data. In the preferred embodiment the chart has a surface having a size approximately four inches by five inches on which the graph 6 is recorded.

FIGS. 1A-1B form a functional block diagram of the preferred embodiment of the reader unit 2. The reader unit 2 provides viewing means for viewing the surface of the chart 4 as an array of discrete informational units; and it also provides bit generating means for generating for each discrete unit one, and only one, respective electrical binary bit having one of two logic values depending upon whether the respective unit is detected as being relatively light or relatively dark as determined by comparison with a preset-table reference level.

The viewing means of the reader unit 2 includes mount means for holding the chart 4 having the graphic data 6 thereon. The mount means is schematically shown in FIG. 1B as a drum or spindle or other rotatable element identified by the reference numeral 8. The drum 8 is illustrated as having the chart 4 mounted thereon. The mount means is further described subsequently with reference to FIG. 2B.

The viewing means of the reader unit 2 also includes a portion of a sensor means 10 for sensing the graphic data and for converting the sensed graphic data into corresponding analog electrical signals. So that the chart 4 mounted on the drum means 8 is movable past the sensor means 10 in a first direction, the viewing means 2 further includes first drive means shown in FIG. 1B as including a drum motor 12 and a drum motor control circuit 14. The drum motor control circuit 14 has movement detection and encoding means 16 associated therewith for detecting how far and how fast the drum 8 is rotated by the motor 12.

The viewing means further comprises second drive means including a stepper motor 18 and a stepper motor control circuit 20. The second drive means moves the sensor means 10 in a second direction relative to the graphic data 6 contained on the chart 4 mounted on the drum 8. In the preferred embodiment the first drive means rotates the drum 8 and the chart 4 mounted thereon in front of the sensor means 10, and the second drive means moves the sensor means 10 in a direction substantially parallel to the longitudinal axis (i.e., the axis of rotation) of the drum 8.

To coordinate the operations of the sensor means 10, the first drive means and the second drive means so that the discrete informational portions of the graphic data are sequentially read, the preferred embodiment of the reader unit 2 also includes a timing means which forms part of the bit generating means. The timing means includes clock generator means 22, timing and phasing means 24, start scan logic means 26, video counter means 28, and byte detecting means 30.

To determine whether a detected portion of the chart 4 is relatively light or dark, the bit generating means also includes a video portion which comprises a portion of the sensing means 10 and a binary conversion means 32 for comparing each of the electrical signals provided by the sensor means 10 to a predetermined reference level and for converting the electrical signals from the sensor means 10 above the reference level into respective binary bit signals each having a first logic value and for converting those electrical signals from the sensor means 10 below the reference level into respective binary bit signals each having a second logic value.

FIG. 1B further shows that the reader unit 2 also includes a lamp and motor triac control circuit 34, camera power supply means 36, and power regulating means 38.

Figure 2A:
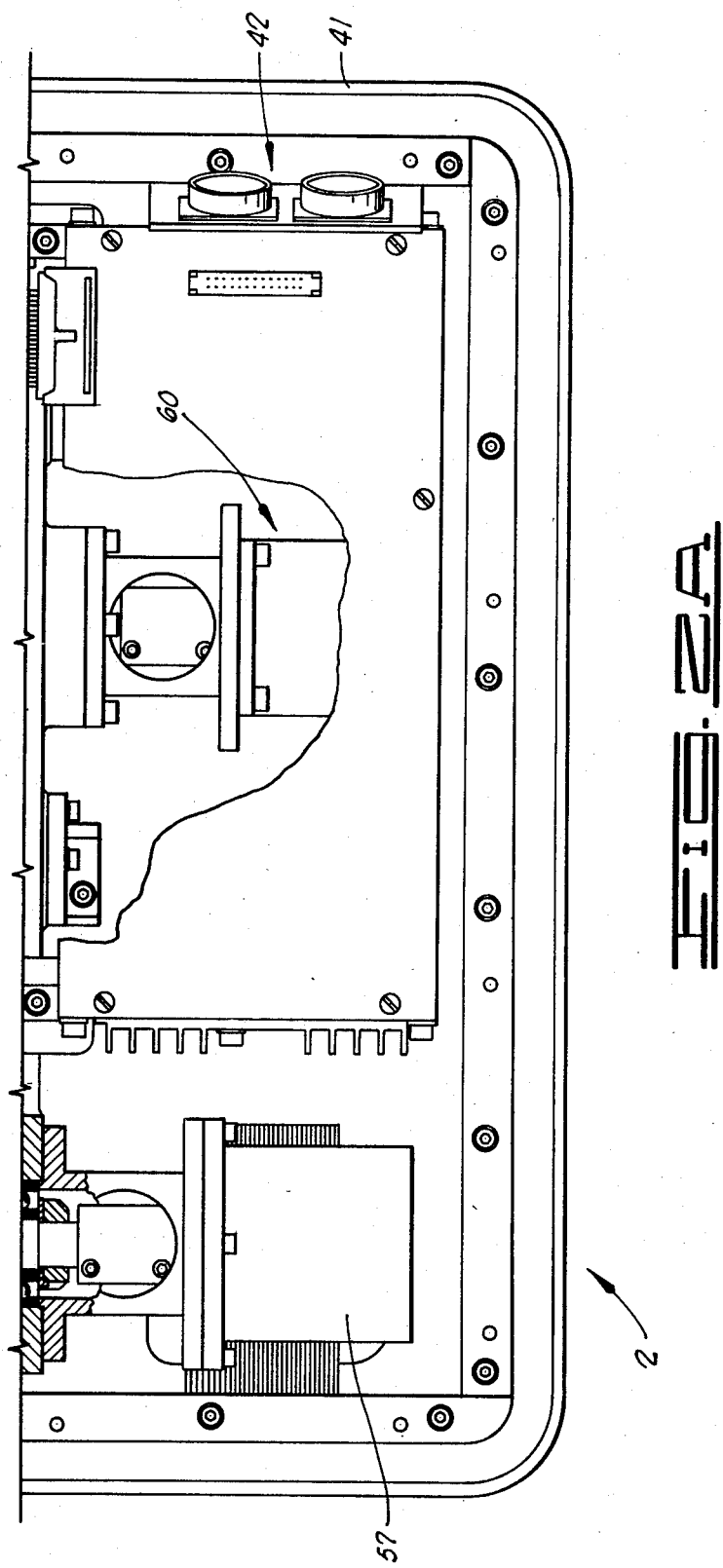

With reference to FIGS. 2A-6 the preferred embodiment of the reader unit 2 will be more particularly described. FIGS. 2A-2B schematically illustrate the preferred assembly of the reader unit 2 contained in a portable container or housing 40 of a size suitable for being hand-carried by a person or otherwise portable. In the preferred embodiment the container or housing 40 is substantially the size of a suitcase, and the container includes a lower or bottom portion 41 and an upper or top portion 43. The container 40 is preferably constructed of a durable substance to protect the reader unit 2 contained therein from the harsh environments in which the present invention is contemplated to be used. Mounted in the container 40 are electrical connectors 42 to which a cable (not shown) is connected for electrically coupling the reader unit 2 to the control processor which is contained in another housing similar to the housing 40 and which is used locally with the reader unit 2.

One element of the reader unit 2 shown in FIGS. 2A-2B is the mount means which includes a drum or spool 44 which is integrally formed on a shaft 45 in the preferred embodiment and on which the chart 4 is mounted and held in place by clips 46 and blocks 47. The drum 44, which corresponds to the drum 8 schematically illustrated in FIG. 1B, is substantially cylindrical and made of stainless steel in the preferred embodiment. Each of the blocks 47 is adjustably mounted on the drum 44 by adjustment means shown as two screws 48 in FIG. 2B. Each of the clips 46 is pivotally mounted between respective ones of the blocks 47 by a rod 49. The clips 47 are variably positionable adjacent the drum 44 by appropriately tightening or loosening each of the screws 48.

To protect the drum 44 and the chart 4 during operation of the present invention, the reader unit 2 also includes a drum cover 51 (shown in FIG. 6) whose open or closed status is monitored by the control processor to insure that the cover 51 is closed during a reading operation of the present invention. The cover 51 is slidably disposed in a track formed in the housing 40 so that when the upper and lower portions of the housing 40 are connected, the cover 51 can be moved from a closed position (the position of the cover 51 shown in FIG. 6) to an open position in which the cover 51 is disposed below, or underlies, the drum 44 to catch the chart if it is dropped during the time one is trying to clip the chart to the drum or if it is otherwise not properly received by the drum 44 when the cover is at the open position.

To rotate the drum 44 in a controllable manner, the reader unit 2 also includes a drum motor (corresponding to the motor 12 shown in FIG. 1B) which is contained in a housing 55 shown in FIG. 2B and which is coupled to the drum 44 and the shaft 45 by suitable means for transferring rotary motion from the motor to the drum 44. The precise position and speed of the drum on the shaft 45 is measured electronically by a postioner encoder means 57 of a type known in the art. The encoder 57 is illustrated in FIG. 1B as the element 16. When the motor rotates the drum 44 during a reading operation, an illumination means, such as a lamp 50, is energized to illuminate the chart 4 positioned on the drum 44. The lamp 50 is prevented from being illuminated whenever the cover 51 does not engage the switch means 53. This prevents the lamp from damaging the cover 51 by being illuminated when the cover 51 is in its open position.

To receive light which is reflected by the chart 4, the reader unit 2 also includes light receiving means comprising the sensor means 10 which in the preferred embodiment includes a camera or optical lens 52 and a photo-responsive element such as a Fairchild CCD 142 optical sensor (not visible in FIGS. 2A-2B). The optical lens 52, the photo-responsive element and the associated conditioning and timing circuitry are mounted on a suitable carriage means 54.

Because the preferred embodiment optical lens 52 and photo-responsive element cannot detect the entire width of the chart 4 from a single position relative to the drum 44, carriage movement means is provided in the reader unit 2. The carriage movement means includes in the preferred embodiment shown in FIGS. 2A-2B a ball bearing lead screw 56 extending axially through a complementally constructed ball nut assembly 58 on which the optical lens 52 and the photoresponsive means are mounted. The carriage movement means also includes a stepper motor 60 (corresponding to the motor 18 shown in FIG. 1B) which is controlled to precisely position the optical lens 52 and the associated photo-responsive element so they detect segments or strips of the chart 4 as it is rotated by the drum motor disposed in the housing 55.

These elements of the reader unit 2 are suitably retained in the portable container 40 and cushioned therein so that they are relatively protected.

Also suitably mounted within the container 40 are printed circuit boards containing the circuits which are schematically illustrated in FIGS. 3A-5C. These drawings disclose the preferred embodiments of the circuits for implementing the functional elements shown in FIGS. 1A-1B.

Figure 3A:
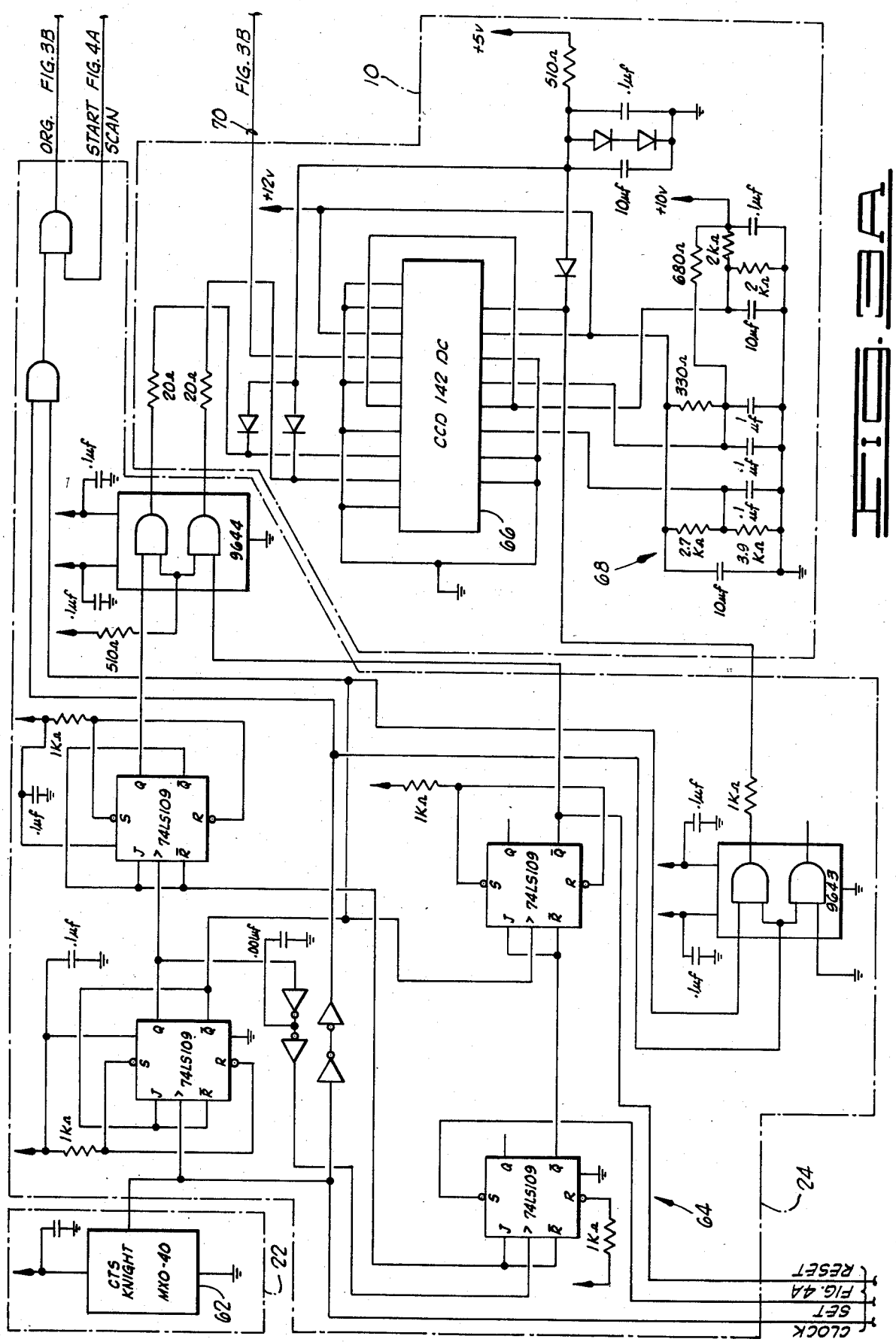

FIG. 3A discloses the preferred embodiment circuits for the clock generator means 22, the timing and phasing means 24, and the photo-responsive element of the sensor means 10. The clock generator means 22 includes an integrated circuit timing pulse generator means 62 which is connected in the preferred embodiment to provide a nominal frequency of 3.00 MHz. The timing signal from the clock generator means 22 drives a plurality of flip-flops 64 included within the timing and phasing means 24.

The timing and phasing means 24 provides five output signals. One of the outputs is identified as the ORG signal (a master control signal), another output is identified as a reset control signal, and the other three outputs are identified as being connected to a Fairchild CCD 142 integrated circuit optical sensor chip or photo-responsive element 66 previously mentioned as forming a part of the sensor means 10. The three outputs connected to the sensor means 10 control the operation of the photo-responsive element 66.

The photo-responsive element 66 also has connected thereto suitable circuit means 68 of a type as is known in the art. The element 66 provides an output along a conductor means 70 which is connected to an input of a video amplifier means 72 forming a part of the binary conversion means 32 and having a preferred embodiment circuit as shown in FIG. 3B.

The video amplifier means 72 appropriately amplifies the output signal received along the conductor means 70 from the integrated circuit optical sensor 66. The amplified signal from the video amplifier means 72 is provided to a first input of a comparator means 76 having a preferred embodiment as shown in FIG. 3B.

Connected to a second input of the comparator means 76 is the reference level signal which is used to determine whether a relatively dark portion or a relatively light portion has been detected on the chart 4. If the video amplifier output signal is below the value of the reference signal on the second input of the comparator means 76, a relatively dark portion has been detected; if the video amplifier output signal is above the reference level signal, a relatively light portion of the chart 4 has been detected.

When a relatively dark portion has been detected, a flip-flop 78 provides a binary bit in the form of an electrical signal having a magnitude representing a low or "0" logic level. When a relatively light portion has been detected, the flip-flop or latch 78 provides a binary bit in the form of an electrical signal having a magnitude representing a high or "1" logic level. These binary bits form the binary video signals as labeled in FIG. 3B.

The reference level signal is determined by summing via a summing means 80 a threshold signal generated by the control processor and a signal provided by a black background clamp sample hold means 82 having a preferred embodiment circuit shown in FIG. 3B. The black background clamp sample hold means 82 is responsive to a valid video signal initiated by a first-sixteen counter means 84 shown in FIG. 1A (and more particularly shown in FIG. 4B) and a chart valid signal generated in the control processor unit in response to an indexing signal and a one mil signal shown in FIG. 5B. The summing means 80 and the means 82 form a reference level setting means.

The elements 72, 76, 78, 80, 82, and 84 form the binary conversion means 32 shown in FIG. 1A.

FIGS. 4A-4B show additional preferred embodiment circuits of the reader unit 2. Shown in FIG. 4A are the start scan logic means 26 and the byte strobe means 30.

The start scan logic means 26 includes flip-flops 86 which are responsive to the reset control signal provided by the timing and phasing means 24 shown in FIG. 3A. The flip-flops 86 provide a set signal and a start scan signal which are transmitted to the timing and phasing means 24 as shown by the continuous lines which are similarly labeled in FIG. 3A and FIG. 4A.

The start scan logic means 26 also includes flip-flops 88 which are responsive to the one mil signal subsequently described and the clock signal from the clock generator means 22 shown in FIG. 3A.

The byte strobe means 30 includes combinational logic byte detecting means 90 shown in FIG. 4A. The byte detecting means 90 is responsive to the video counter means 28 particularly shown in FIG. 4B and to the ORG signal provided by the timing and phasing means 24. In the preferred embodiment the byte detecting means 90 is responsive to each eighth count counted by the video counter means 28 so that a byte strobe signal is provided thereby defining a byte of video information to include eight bits. More broadly, the byte detecting means responds to each nth count to define a byte to have n bits.

FIG. 4B discloses the first-sixteen counter means 84, the video counter means 28 and an EOS trigger means 92.

The first sixteen counter means 84 generates the valid video signal after sixteen ORG pulses have been detected after the receipt of an EOS signal.

The video counter means 28 includes three binary counter integrated circuits which count 2,048 ORG pulses before activating the generation of the EOS signal. The signal from the video counter means 28 indicating that 2,048 pulses have been counted is provided to the EOS trigger means 92 for generating the EOS signal. As will be understood upon an examination of the schematic circuit diagrams, the ORG signal is the master clocking signal and the EOS signal is the master resetting signal of the present invention. The one mil signal is the primary "start scan" signal.

FIG. 5A discloses the preferred embodiment circuit of the stepper motor control means 20 for providing the drive energization to the stepper motor 60 shown in FIG. 2A and corresponding to the motor 18 shown in FIG. 1B. The stepper motor control means 20 includes left and right limit switch inputs 94 which are connected to suitable switch means 95 (shown in FIGS. 1B and 2B) which can be actuated to limit the left and right movement of the lens 52 and the photo-responsive element 66 along the screw 56 shown in FIG. 2B.

The stepper motor control means 20 also includes inputs for receiving a step trigger signal and a direction signal from the control processor for controlling a stepping motor control integrated circuit means 96 of the type known in the art. The integrated circuit means 96 provides the proper sequence of signals to drive transistors 98 which interface the stepper motor control means 20 to the stepper motor 60 to thereby cause the motor to provide either forward or reverse rotation.

In the preferred embodiment the stepper motor control means 20 is controlled to move the optical lens 52/integrated circuit sensor 66 combination in precise increments so that strips or segments of the chart 4 are read as the drum 44 rotates. Once a strip or segment of the chart 4 has been read, the stepper motor control means 20 is activated to drive the stepper motor 60 so that the lens 52 and the integrated circuit sensor 66 are moved a predetermined distance to read the next strip or segment of the chart 4.

FIG. 5B discloses the preferred embodiment circuits of the one mil buffer and drum motor control means 14. The preferred embodiment includes an encoder signal receiving section 100 which receives the input from the encoder 57 associated with the drum 44 (schematically shown in FIG. 1B as the encoder 16 and the drum 8). The encoder signal receiving section 100 detects when the drum motor in the housing 55 has rotated the drum 44 one mil. When this occurs, the encoder receiving section 100 provides a signal to a switch means 102. The switch means 102 is manually switchable to select as a one mil signal either the output of an EXCLUSIVE NOR gate 104 forming a portion of the encoder receiving means 100 or the output of an auxiliary timer means 106 for synthesizing or imitating the one mil signal so that the camera circuits can be tested without the drum 44 rotating.

Also included within the one mil buffer and drum motor control means 14 is a frequency-to-voltage converter means 108 which activates a drum motor drive circuit 110 to actuate and control the drum motor.

FIG. 5C discloses the preferred embodiment circuit of the lamp and motor triac control means 34, the camera power supply means 36, and the circuit elements utilized to provide regulated power sources. The lamp and motor triac control means 34 is responsive to a drum cover interlock signal indicating the status of the drum cover. When the drum cover 51 is closed (thereby engaging the switch 53), the lamp and motor triac control means 34 illuminates the lamp 50.

The control processor unit mentioned hereinabove with respect to the means for controlling the operation of the reader unit 2 includes any suitable type of control device. In the preferred embodiment the processor unit comprises microcomputer means including a Digital Equipment Corporation LSI-11/23 16-bit microprocessor, 64k words of read/write memory (RAM), and 16k words of non-volatile program and data table memory (ROM). The microcomputer means controls the operation of the reader unit 2 from power-up to power-down. The 16k words of ROM contain all the words of the programs needed to operate the reader unit 2.

With reference to all the drawings, the operation of the preferred embodiment of the present invention will be given with reference to the exemplary contemplated use of reading a drill stem test pressure chart.

The chart 4 has scribed thereon the pressure versus time line 6. This line is created by placing the chart 4 in a downhole tool, such as described hereinabove, so that a pressure responsive member can scribe on the chart 4 a line representing the detected pressure over a known time period. The scribed line 6 in the preferred embodiment is a shiny line on a dark background because the chart 4 is a brass sheet coated with a flat black paint. However, the present invention can be constructed to also function with a relatively dark indicia on a relatively light background.

Once a scribed chart is obtained, the chart is retained on the stainless steel drum 44 by means of the clips 46. Once the chart is mounted on the drum 44 and the apparatus 2 is actuated to read the chart, the light 50 is illuminated so that a brilliant light is reflected from the surface of the chart 4 into the eye of the lens 52 focused on the chart and thus to the photo-responsive element 66.

The shinier the surface of the chart, the less the light is diffused before reaching the camera lens; conversely, the duller the surface of the chart, the more the light is diffused. Based on the amount of diffusion, the video portion of the reader unit 2 classifies the light as either negligible or intense. Areas of the chart which reflect negligible light are considered black. Areas of the chart which reflect intense light are considered scribed lines.

The decision whether the reflected light detected by the optical lens 52 and the photo-responsive member 66 associated therewith constitutes a black area or a light area (which light area would indicate the scribed line 6) is made by the video portion of the reader unit 2. This portion is generally identified in FIG. 1A and more particularly shown in FIGS. 3A and 3B. Broadly, these elements compare the analog electrical signal from the CCD 142 sensor 66 (the photo-responsive member) with the reference level established at the output of the summing means 80. If the analog signal from the sensor 66 is below the reference level, the video portion determines that a dark region has been observed; if the analog value is above the reference level, the video portion determines that a light area has been detected. Corresponding to this determination, if a dark area has been detected, the output of the latch means 78 provides a logical low level or "0" bit; if a light area has been detected, the output of the latch means 78 is a logical high level or "1" bit. The series of electrical zeros and ones provided by the latch means 78 constitutes the binary video signal labeled in the drawings.

To read the entire chart 4, the present invention divides the chart 4 into substantially equal discrete areas which are viewed and then converted into respective binary bits depending upon whether the viewed area is determined to be a dark or a light area. In the preferred embodiment the chart 4 is a four inch by five inch metal sheet. The surface of this chart in which the pressure versus time graph is scribed is viewed as a collection or array of one-half mil by one mil areas. By viewing the chart 4 in this manner, the preferred embodiment of the present invention converts the four inch by five inch surface area into $4 \times 10^7$ bits of serial binary data when an entire chart has been read. It is to be noted that different types, sizes and areas of the charts or other media can be read by the present invention, but the preferred embodiment disclosed herein is particularly adapted to read four inch by five inch drill stem test charts in one-half mil by one mil areas.

This division into discrete areas is achieved by appropriately controlling the operation of the drum motor in the housing 55 (motor 12 in FIG. 1B) and the stepper motor 60 (motor 18 in FIG. 1B). The drum motor is controlled to rotate the chart 4 mounted on the drum 44 in one mil increments. This control is achieved through feedback provided by the encoder means 57 (encoder 16 in FIG. 1B) which detects how far and how fast the drum 44 is rotated by the drum motor.

The stepper motor 60 is controlled in the preferred embodiment to move the optical lens 52 and the photo-responsive element 66 in four increments axially with respect to the length of the drum 44. In particular, the drum motor is actuated and the lamp 110 is illuminated, then the stepper motor 60 is actuated to move the lens 52 and photo-responsive element 66 to the right end of the chart 4 mounted on the drum 44 as indicated by hatched line 112 shown in FIG. 2B. This positions the lens 52 and the element 66 to read one-fourth of the dimension of the chart 4 extending axially or longitudinally along the drum 44. Next, the chart on the drum 44 is sampled in one mil increments until the entire quarter strip is read. Thereafter, the stepper motor 60 is actuated to move the lens 52 and element 66 one increment to the left to read the next quarter strip of data contained on the chart 4. The chart on the drum is read again until the entire strip is read. Similarly, the third and fourth quarter strips to the left of the first two strips are read by the optical lens and photo-responsive element.

Upon reading the entire chart, the stepper motor 60 is actuated to return the lens 52 and photo-responsive element 66 to the right-most position and the drum motor is deactivated to stop the drum 44 from rotating. The read lamp 50 is then extinguished.

Through this procedure each of the one-half mil by one mil areas is viewed and analyzed to be either a light or dark area as signified by the electrical "ones" and "zeros" of the binary video stream of electrical binary signals. This feature of viewing a surface as an array of discrete areas, reading every discrete area as a light or dark area and converting each area into a respective one of two binary signals is an important feature of the present invention.

Timing control for the reading operation is maintained by the timing portion of the present invention generally shown in FIG. 1A and more particularly shown in FIGS. 3A and 4A–4B. The primary or master timing signal is the ORG signal generated by the timing and phasing circuit 24 shown in FIG. 3A. After the first sixteen pulses of the ORG signal have been counted by the first sixteen counter means 84 shown in FIG. 4B, the present invention determines that valid video information can be received. This is indicated by the valid video signal labeled in FIG. 4B.

Once valid video is determined to exist, the video counter means 28 counts up to 2,048 pulses of the ORG signal. When this maximum count is reached, the EOS signal is generated by the EOS trigger means 92 to reset the timing of the apparatus. The one mil signal initiates the "start scan" signal.

Summarizing the preferred embodiment operation of the reader unit 2, the apparatus initially automatically determines the optical read threshold needed to locate and distinguish the shiny scribed lines of the graph 6 from the flat black background of the chart 4. The apparatus then divides the chart into one-inch strips along the time axis to accommodate the one-inch fields of view of the lens 52 and photo-responsive element 66. To process each strip of the chart 4, the reader unit 2 reads each strip in one-half mil by one mil resolution as a sequence of bits by using the bright light 50, the lens 52 and the electronic photo-responsive element 66. Once a single strip has been processed, the camera carriage is moved to the next strip and the operation loops back to process this next strip. This process continues until all strips of the chart 4 have been processed.

It is noted that the specific component values and numbers shown in the drawings are for the purpose of disclosing the specific preferred embodiment. These values and numbers are not to be taken as necessarily limiting the present invention to those specific values and numbers shown.

It is also noted that the present invention can be constructed to read indicia other than graphic data contained on a drill stem test chart.

Thus, the present invention is well adapted to carry out the objects and attain the ends and advantages mentioned above as well as those inherent therein. While the preferred embodiment of the invention has been described for the purposes of this disclosure, numerous changes in the construction and arrangement of the parts can be made by those skilled in the art, which changes are encompassed within the spirit of this invention as defined by the appended claims.

What is claimed is:

1. An optical reader, comprising:
   a housing;
   a drum rotatably mounted in said housing for receiving indicia-carrying means which is to be read by said optical reader;
   drum drive means for rotating said drum about a longitudinal axis;
   illumination means for illuminating the indicia-carrying means when it is mounted on said drum;
   optical lens means for receiving light reflected from said indicia-carrying means mounted on said drum;
   photo-responsive means for converting said light received by said optical lens means into electrical signals;
   carriage means having said optical lens means and said photo-responsive means mounted thereon;
   carriage movement means for moving said carriage means and said optical lens means and said photo-responsive means mounted thereon substantially parallel to said longitudinal axis of said drum;
   control means for incrementally activating said carriage movement means to position said optical lens means and said photo-responsive means along the length of said drum and for actuating said drum drive means for incrementally rotating said drum after said carriage movement means has positioned said carriage means at a predetermined position along the length of said drum; and
   wherein said housing includes a cover slidably disposed therein, said cover being movable to an open position underlying said drum for receiving the indicia-carriage means if said drum does not properly receive the indicia-carrying means while said cover is at said open position.

2. An optical reader as defined in claim 1, further comprising:
   a plurality of block means;
   adjustment means for adjustably connecting said block means to said drum; and
   clip means pivotally retained between respective ones of said block means, said clip means being variably postionable adjacent said drum by movement of said adjustment means.

3. An optical reader, comprising:
   a portable container, said portable container including an upper portion and a lower portion;
   a drum shaft rotatably disposed in said portable container;
   a drum mounted on said drum shaft;
   a first electric motor mounted in said portable container;
   first coupling means for mechanically coupling said first electric motor to said drum shaft;
   encoder means, mounted in said portable container in association with said drum shaft, for measuring the position of said drum on said drum shaft;
   an electric lamp mounted in said portable container adjacent said drum;
   a second electric motor mounted in said portable container in spaced relation to said first electric motor;
   a carriage shaft rotatably mounted in said portable container in substantially parallel relation to said drum shaft and coupled to said second electric motor for rotative movement thereby;
   carriage means mounted in said portable container, said carriage means including second coupling means for cooperating with said carriage shaft to move said carriage means linearly along said carriage shaft when said carriage shaft rotates;
   an optical lens, mounted on said carriage means, for receiving light from said lamp reflected by an object mounted on said drum;

photo-responsive means, mounted on said carriage means, for converting said light received by said optical lens into electrical signals;

control means for activating said second electric motor to incrementally position said carriage means with said optical lens and said photo-responsive means along said carriage shaft and for activating, in response to said encoder means, said first electric motor to incrementally rotate said drum shaft and said drum after said carriage means with said optical lens and said photo-responsive means have been positioned by said second electric motor; and a cover slidably associated with said portable container so that said cover is movable between a closed position overlying said drum and an open position underlying said drum when said upper and lower portions of said portable container are connected.

4. An optical reader apparatus for scanning a surface of an indicia-carrying medium, said apparatus comprising:

mount means for holding said medium;

drive means for moving said mount means;

photo-responsive means for sensing light reflected from said medium and for converting the sensed light into electrical signals;

encoder means for detecting and indicating when said drive means has moved said mount means a predetermined distance;

start scan logic means including:
first integrated circuit means, responsive to said encoder means, for providing a SET electrical signal; and second integrated circuit means for providing a START SCAN electrical signal;

timing and phasing means including:
third integrated circuit means, responsive to said SET electrical signal, for providing a RESET electrical signal, said RESET electrical signal being communicated to said second integrated circuit means to actuate said second integrated circuit means to provide said START SCAN electrical signal;

fourth integrated circuit means, responsive to said START SCAN electrical signal, for providing a master control signal; and fifth integrated circuit means for providing a plurality of control signals to said photo-responsive means; and binary conversion means, responsive to said master control signal, for converting said electrical signals from said photo-responsive means into respective binary bit signals, each of said binary bit signals representing either a relatively dark portion or a relatively light portion on said medium.

5. The apparatus as defined in claim 4, wherein said binary conversion means includes:

first counter means for providing a VALID VIDEO electrical signal in response to detecting a predetermined number of pulses in said master control signal;

video amplifier means for amplifying said electrical signals from said photo-responsive means;

reference setting means, responsive to said VALID VIDEO electrical signal, for providing a reference level signal;

comparator means, responsive to said video amplifier means and said reference setting means, for comparing the amplified electrical signals with said reference level signal to determine whether a relatively dark portion or a relatively light portion has been detected on said indicia-carrying medium; and sixth integrated circuit means, responsive to said master control signal, for temporarily storing a logic bit representing whether said comparator means has determined there has been a relatively dark portion or a relatively light portion detected on said medium.

6. The apparatus as defined in claim 5, further comprising:

second counter means, responsive to said VALID VIDEO electrical signal and said master control signal, for counting a predetermined number of pulses of said master control signal after said first counter means provides said VALID VIDEO signal; and means, responsive to said second counter means, for generating a master resetting control signal, said master resetting control signal being communicated to said first counter means, said second counter means, said first integrated circuit means, and said second integrated circuit means.

* * * * *

UNITED STATES PATENT AND TRADEMARK OFFICE
CERTIFICATE OF CORRECTION

PATENT NO. : 4,551,766

DATED : November 5, 1985

INVENTOR(S) : John E. Mosier; Jim B. Surjaatmadja, Jack C. Penn and John J. Moon It is certified that error appears in the above-identified patent and that said Letters Patent is hereby corrected as shown below:

On the title page, at the line designated "[75] Inventors:" add -- John J. Moon-- as an inventor.

Column 12, line 27, Claim 1, delete "indicia-carriage" and insert --indicia-carrying--.

Signed and Sealed this

Twenty-fifth Day of February 1986

[SEAL]

Attest:

DONALD J. QUIGG

Attesting Officer

Commissioner of Patents and Trademarks